June 28, 1932. W. F. KIESEL, 3D 1,865,113
CABLE PULLING DEVICE
Filed Dec. 19, 1928 2 Sheets-Sheet 1
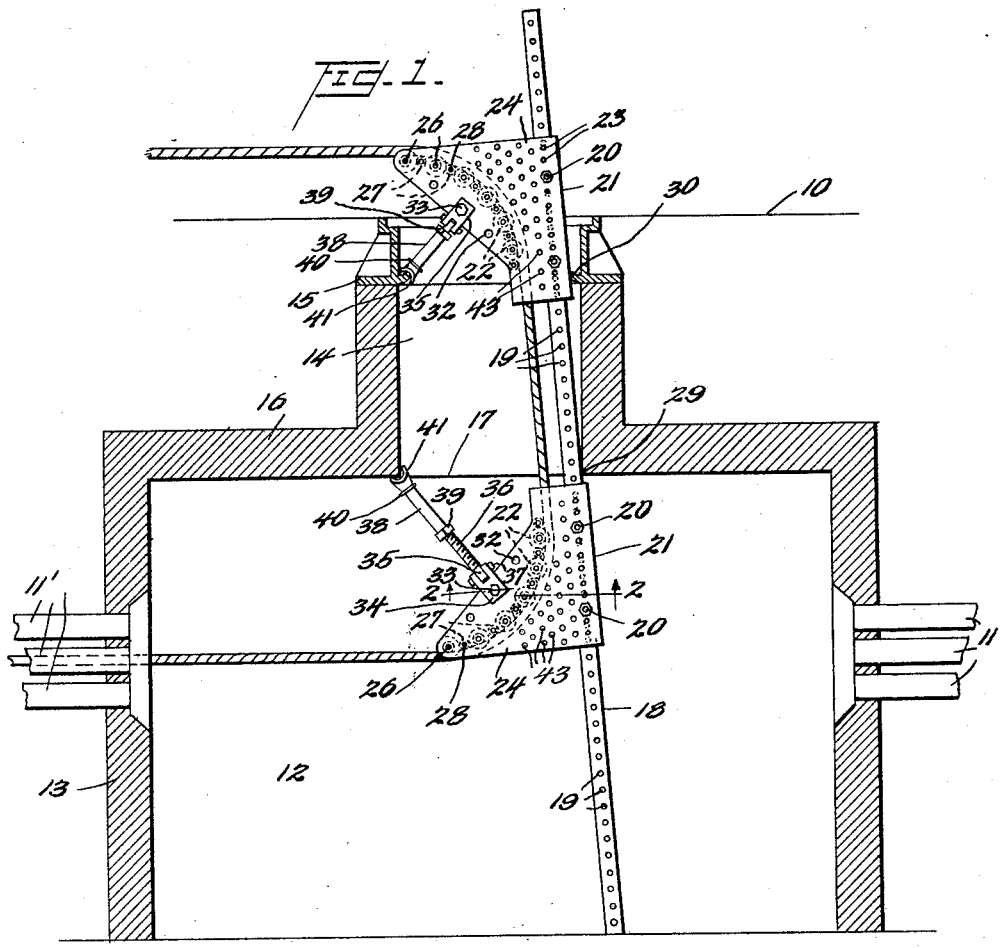
Inventor
William F. Kiesel, 3rd
By Watson, Coit, Morse & Grindle
Attorney

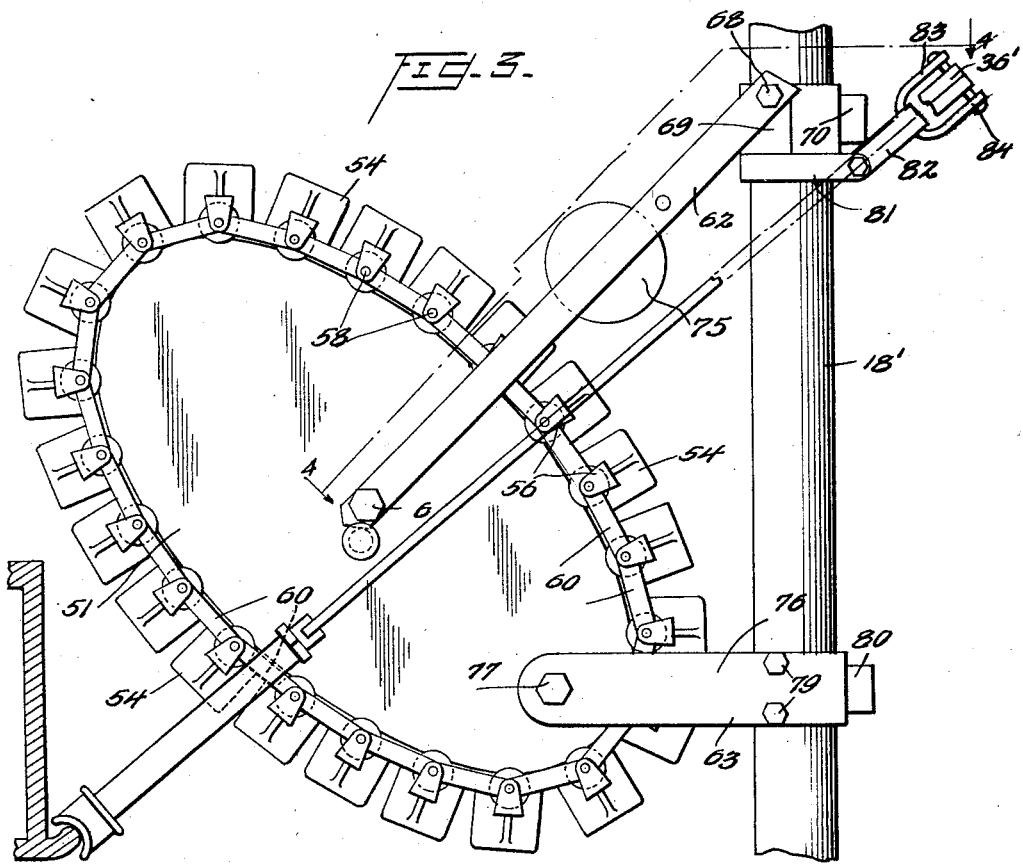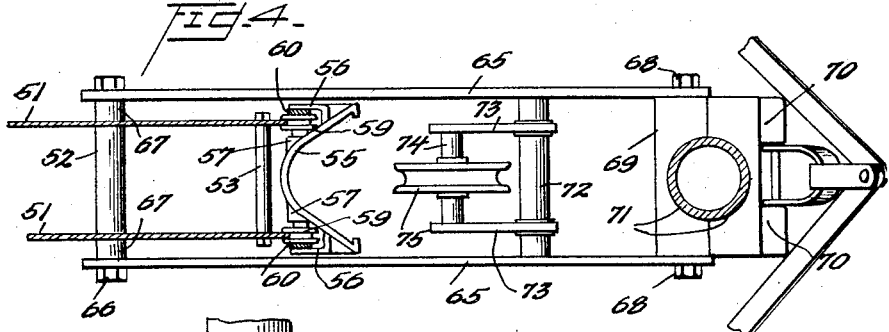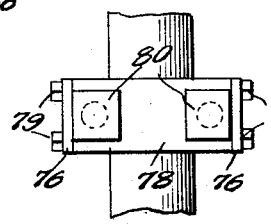

Patented June 28, 1932

1,865,113

UNITED STATES PATENT OFFICE

WILLIAM F. KIESEL, 3D, OF NEW YORK, N. Y.

CABLE PULLING DEVICE

Application filed December 19, 1928. Serial No. 327,141.

This invention relates to a cable pulling device, and particularly to a device for pulling in or removing cables from underground ducts or conduits.

The invention contemplates the provision of simple means for pulling in or removing electrical cables from underground ducts and provides means for changing the direction of the cable so that it can be lead from the manhole into which the duct enters.

Among the important features of the invention may be particularly mentioned the use of a group of sheaves arranged substantially in the arc of a circle and serving to change the direction of movement of the cable from horizontal to substantially vertical so that it can pass out through the manhole chimney.

Another important feature of the invention comprises the use of a boom provided with two sets of sheaves arcuately disposed on members adjustable relative to the boom so that a direct pull in alignment with the duct can be provided and the cable can be disposed to travel on the surface in the direction from whence it is removed from the duct.

Another feature of the invention comprises a novel adjustable means for mounting the boom and its supported sheave members in a manhole.

Other and further features and objects of the invention will be more apparent to those skilled in the art upon a consideration of the accompanying drawings and following specification wherein are disclosed two exemplary embodiments of the invention with the understanding, however, that such changes may be made therein as fall within the scope of the appended claims without departing from the spirit of the invention.

In said drawings:

Figure 1 is a vertical section through a manhole showing the apparatus of the present invention in position therein;

Figure 2 is a partial horizontal section on line 2—2 of Figure 1;

Figure 3 is a side elevation of a modified form of sheave construction;

Figure 4 is a section on line 4—4 of Figure 3; and

Figure 5 is an elevation of a clamping member.

When drawing in or removing electric cables from underground ducts or conduits, considerable difficulty is experienced in changing the direction of pull and of movement of the cable or of the drawing-in rope so that power may be suitably applied to the same upon the surface without the use of cumbersome apparatus liable to damage the walls of the manhole. The present invention makes use of a simple boom, and by virtue of its arrangement and the changes in direction in the cable, it is substantially in compression only, and yet serves to position the cable guides within the manhole.

The invention is disclosed for convenience in conjunction with the substantially conventional form of underground manhole as used by most power and telephone companies. The street level is shown at 10 and at a distance beneath it a plurality of ducts divided into sections 11 and 11' by the manhole 12. It preferably has walls such as 13 of brick or re-enforced concrete and provides room for workmen and space for cable splices and the like. Entrance to the manhole is provided through the chimney 14 having the metal re-enforcement 15 at its upper end adapted to receive a conventional form of manhole cover (not shown). The chimney is preferably square and meets the horizontal upper wall 16 of the manhole forming an edge 17.

The ducts 11 and 11' are adapted to receive cables which may or may not be covered with lead as a moisture-proof coating and mechanical protection to the insulation. Where these cables are of considerable size, they are quite stiff and cannot be bent sharply without serious damage both to the lead cover and to the core. The manhole is not of sufficient size to receive machinery for pulling the cable when it is desired to remove it for replacement or repair. The same is true when the cable is being drawn in position by the use of a rope or steel stranded cable In order to change the direction, therefore, of the cable from horizontal to vertical and again to horizontal so that a pull can be applied by a winch or the end of the cable can be attached to a moving vehicle, resort is had to the device of the present invention.

The apparatus of the present invention is assembled about a boom 18 which may conveniently be a suitable length of circular pipe of sufficient strength. In the form of the invention shown in Figures 1 and 2, it is provided with a plurality of closely spaced holes 19 passing from side to side therethrough to receive the adjusting screws or bolts 20 which serve to fasten to the boom at adjusted positions thereon the frames 21. Each frame carries a plurality of sheaves 22 preferably arranged in substantially arcuate formation so that when the frames are properly adjusted as shown in Fig. 1, the cable leaves the duct without any appreciable friction with the edges thereof, passes around the set of sheaves 22, then substantially parallel to the boom, around the second set of sheaves, and then can be drawn along the surface of the street substantially parallel to its direction of movement in the duct but in the opposite direction.

Referring to Figure 2, it will be seen that the frames 21 are bent up from heavy metal plate substantially U-shaped with the bend of the U of such radius as to closely fit the sleeve 21' secured thereto and having a sliding fit on the pipe boom 18. Suitable holes 23 may be provided in the sleeve and the sides of the U to receive the adjusting bolts 20, and they are preferably at a different distance apart than the holes of the boom to provide a greater number of adjustments.

The side plates 24 of the frames are substantially triangular as shown, and each is provided with a series of holes 25 along an arc to receive the spindles 26 of the sheaves 22 which are each of small diameter with a substantially semi-circular grooved face to conveniently receive the cable. Between each pair of sheaves, it is preferred to arrange a roller 27 which may conveniently be a section of pipe or similar tubing mounted on a spindle 28 passing through holes in the side plates. These rollers preferably have the same diameter as the minimum diameter of the sheaves so that close spacing of the rollers and sheaves can be had which provides an almost continuous arcuate surface over which the cable can pass with but little damage thereto. The radius of the arc of the quadrant can well be more than half the diameter of the manhole and can be such that there is just sufficient room to admit the frame member through the manhole chimney. This permits the cable to be bent at a much larger radius than would be possible by the use of a single large pulley and makes the present device practical for use with large cables which cannot be sharply bent.

The boom is conveniently mounted by setting its bottom against the bottom of the manhole and allowing its rear face to engage the edge 17 of the junction of the manhole and chimney, as shown at 29. The curved portion of the upper frame 21 or the boom, depending on the adjustment, will engage the lip 30 of the manhole cover frame and will determine the angle of the boom.

Any convenient means can be used for holding the boom in position. It is found desirable to have these means incorporated with the frames carrying the sheaves. Here each frame is shown as provided with a plurality of holes 32 within the arc of the sheaves to adjustably receive a bolt 33 which secures to the frames a pair of blocks 34, each having a forked end receiving the end 35 of a screw 36 which is adjustably secured therein by a pin 37. A sleeve 38 is threaded over the screw 36 and conveniently provided with a nut 39 for the reception of a wrench. It is swiveled at 40 to a claw 41.

The latter assembly forms an adjustable strut, and as shown, the ones secured to the lower sheave frame are spread and adjusted with the claws against and straddling the edge formed by the junction of the chimney wall and the top wall of the manhole, whereas the ones at the top have their claws surrounding the lip 30 on the manhole cover frame. When the struts are extended by rotation of their sleeves, the boom and its assembly can be tightly thrust against the rear wall of the manhole chimney and rigidly held in position with but little chance of any damage to the manhole construction.

Since the direction of pull on the cable in the street is substantially parallel to that of the cable in the duct, all vertical forces are balanced out with the exception of the compression strains on the boom. Furthermore, the cable is bent in but a single direction, which is an important factor in increasing its life.

The equipment is quite light in weight, which facilitates rapid handling and enables it to be braced in position in the manhole with but little effort, the braces or struts taking care of all horizontal components of the pulling. The point of support of each sheave member, it will be noted, is back of the center of the arc over which the cable is pulled, so that there is but little tendency for the apparatus to change its position under strain.

It will be appreciated that where delicate cables are used and it is desired to protect the covering as much as possible, resilient material may be fed through and between the cable and the sheaves and may be arranged on the reel, if one is used, which takes up the cable being drawn from the duct.

The sets of adjustments shown in the drawings are for the sake of illustration only. It will be appreciated that the blocks 34 may be attached to the sheave frames in any position desired. For instance, they may be bolted to the frame through any of the holes 43 spaced over the face of the frame. The adjustments provided make the device one of universal adaptability for general cable work.

A modified form of the invention is shown in Figures 3 to 5 inclusive, which disclose only details of the cable guides since the essentials of this embodiment are similar to those shown in Figures 1 and 2. The boom 18′ need not be perforated, however, with the type of clamps shown for retaining the cable guides 50 in spaced relationship on the boom.

Each cable guide, of which but the upper one is shown, is composed of a framework formed of two elliptical plates 51 spaced apart by suitable spacing members 52 and 53 as shown in Figure 4. The edges of these elliptical plates comprise tracks on which the articulated cable guide members 54 are adapted to run. The whole movable portion of the cable guide is really a chain composed of the links 54 running on the periphery of the plates 51. Each member 54 is built up around a trough-shaped segment 55 having the ears 56 and the bosses 57. Between the ears 56 and the bosses 57 are arranged the spindles 58 journaling the grooved pulleys 59 which run on the edges of the disks 51. The members or links 54 are secured together to retain them in position on the disks by means of connecting links or bars 60 which are perforated to be received over the spindles 58.

It will be seen that the chain composed of the links 54 really comprises an articulated movable track having a grooved outer periphery which is adapted to travel around the elliptical plates 51 and to carry the cable in such a manner that it has no relative movement in respect to the links. The action is very much the same as that of a track-laying vehicle in moving over the ground. The curvature of the tracks may be adjusted to suit conditions, but, as will be seen from the drawings, a very flat curve, i. e., one of large radius, can be provided for that portion of the arc over which the cable travels, and curves of short radii can be used to return the track, thus conserving space without causing sharp bends in the cable.

Each track assembly is secured to the boom 18′ by a tension member 62 and a compression member 63. As seen in Figures 3 and 4, the tension member is composed of spaced links 65 pivoted to the disks 51 by means of the bolts 66 passing through the spacer 52 and the spacers 67. The opposite ends of the links 65 are pivoted by means of bolts 68 to one-half of the split block 69. The two halves of the block 69 are adapted to be secured together by the bolts 70 so that the semi-circular channels 71 in the two blocks form a circular opening to fit around the boom.

Tightening the bolts 70 will cause the block to tightly engage the boom and be positioned thereon as desired. For convenience in pulling light wires or drawing-cables through the conduits, it may be desirable to have an ordinary pulley mounted on the boom and not use the main cable guide means just described. For this purpose such a pulley can readily be carried between the tension members 65 from a bar 72 mounted between these members. Links 73 are pivoted to this bar 72 and carry the spindle 74 of the pulley 75.

The compression member is composed of two plates 76 secured to the elliptical disks 51 in a manner similar to the inner ends of the links 65 of the tension member, i. e., by a bolt 77 and suitable spacing members not shown. The tension member has its bolt 66 passing substantially through the center of the disks 51, whereas the bolt 77 passes through the disks near the end of the major axis so that the whole device is mounted in a position to change vertical to horizontal movement while having the cable pass over the flattest portion of the curve.

The plates 76 are attached to a pair of members 78, similar to those indicated at 69 in connection with the tension member, by bolts 79. Bolts 80 hold the two members 78 together and in position on the boom.

It will be seen that the position of the axis of the elliptical disks 51 can be adjusted by adjusting the distance between the members 78 and 69 in order to permit the cable to travel over the arc of longest radius in spite of the directions from which it may come and to which it may go.

Instead of securing the bracing struts to the framework of the cable guide, it is preferred in this form to secure them to the boom such as by means of a U-clamp 81 to which is pivoted a clevis 82 linked to a second clevis 83 having a bolt 84 pivoting the struts 36′ which may be of the same construction as described in connection with Figures 1 and 2. The clamp 81 need not be of such form as to be tightly secured to the boom since the direction in which the struts extend is such as to press this clamp against the block 69. On the bottom cable guide the positions are reversed, and the same will be true. By having the struts pivoted to the boom behind it in respect to the cable guide, it will be seen that a more stable structure is obtained, and there is less likelihood of any displacement of the whole assembly due to the stress of pulling the cable.

This form of device is such that it can be readily substituted for the form described in connection with Figures 1 and 2 and may be found desirable under certain circumstances.

Having thus described the invention, what is claimed as new and desired to be secured by Letters Patent is:

1. In a cable pulling device, in combination, a boom, a member adjustable along said boom, a series of sheaves arcuately disposed on said member and means on said member to support the boom from a manhole chimney.

2. In a cable pulling device, in combination, a boom, a pair of members adjustable along said boom, a series of sheaves arcuately disposed on each member and an adjustable positioning strut supporting each member.

3. In a cable pulling device, in combination, a boom adapted to extend from the bottom of a manhole through the chimney thereof, a pair of members adjustable on said boom, an arcuate cable guide on each member and means to brace each member individually from said chimney.

4. In a cable pulling device, in combination, a boom adapted to extend from the bottom of a manhole through the chimney thereof, a pair of frames adjustable on said boom, an arcuate cable guide on each frame, a pair of extensible struts, and means to attach said struts to said frames in any one of a number of positions.

5. In a cable pulling device, in combination, a boom adapted to extend from the bottom of a manhole through the chimney thereof, a pair of frames adjustable on said boom, an arcuate cable guide on each frame, a pair of extensible struts for each frame, and means to attach each strut to its frame for universal movement in respect thereto.

6. In a cable pulling device, in combination, a boom adapted to extend from the bottom of a manhole through the chimney thereof, a frame secured to said boom, an arcuate cable guide on said frame, means to adjust said frame on said boom to cause said arc to become tangent to the axis of a cable duct entering said manhole and a strut bracing said frame from said chimney and extending substantially radial to said arc.

7. A cable guide for use in a cable pulling device comprising a frame having spaced side members, a plurality of spindles extending between said side members and being arranged in an arc, a grooved sheave on each alternate spindle, and a cylindrical roller on each of the remaining spindles.

8. A cable guide for use in a cable pulling device comprising a U-shaped frame having spaced side plates, the bend of said U being adapted to fit around a boom, a plurality of spindles extending between said plates and arranged substantially along the quadrant of a circle, and sheaves on said spindles, the bisector of said quadrant extending at substantially 45° to said boom.

9. A cable pulling device comprising a boom, a pair of cable guides spaced along said boom, and means to adjust each guide in more than one direction in respect to said boom.

10. A cable pulling device comprising a boom, a pair of cable guides spaced along said boom, means to adjust each guide in respect to said boom, and a brace member adjustably secured to each guide.

In testimony whereof I hereunto affix my signature.

WILLIAM F. KIESEL, 3D.